(12) United States Patent
Borsos et al.

(10) Patent No.: US 11,860,837 B2
(45) Date of Patent: *Jan. 2, 2024

(54) DETERMINING INCONSISTENCIES IN DIGITAL EVIDENCE

(71) Applicant: MOTOROLA SOLUTIONS, INC., Chicago, IL (US)

(72) Inventors: Wyatt Borsos, Chicago, IL (US); Safina Z. Lavji, Lake Forest, IL (US); Jehan Wickramasuriya, Saint Charles, IL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 235 days.

This patent is subject to a terminal disclaimer.

(21) Appl. No.: 17/324,823

(22) Filed: May 19, 2021

(65) Prior Publication Data

US 2021/0271652 A1    Sep. 2, 2021

Related U.S. Application Data

(63) Continuation of application No. 16/358,544, filed on Mar. 19, 2019, now Pat. No. 11,042,521.

(51) Int. Cl.
*G06F 16/215* (2019.01)
*G06N 20/00* (2019.01)
(Continued)

(52) U.S. Cl.
CPC ......... *G06F 16/215* (2019.01); *G06F 16/44* (2019.01); *G06N 20/00* (2019.01); *G06Q 50/18* (2013.01); *G06Q 50/26* (2013.01)

(58) Field of Classification Search
None
See application file for complete search history.

(56) References Cited

U.S. PATENT DOCUMENTS 6,256,627 B1    7/2001 Beattie et al.
8,275,720 B2    9/2012 Islam et al.
(Continued)

OTHER PUBLICATIONS

International Search Report and Written Opinion for Application No. PCT/US2020/021907 dated Jun. 26, 2020 (15 pages).
(Continued)

*Primary Examiner* — Amresh Singh
(74) *Attorney, Agent, or Firm* — Michael Best & Friedrich LLP

(57) ABSTRACT

A system for prioritizing and resolving inconsistencies in digital evidence. The system includes a database containing a first type of data and a second type of data related to an incident record and an electronic computing device including an electronic processor. The electronic processor is configured to receive the first and second types of data from the database, determine an inconsistency between the first and second types of data, and determine an incident type from the incident record. The electronic processor is also configured to determine whether a priority of the determined inconsistency meets a threshold case impact level. When the priority of the inconsistency meets the threshold case impact level, the electronic processor is configured to take a first notification action and when the priority of the inconsistency does not meet the threshold case impact level, the electronic processor is configured to take a second notification action.

19 Claims, 7 Drawing Sheets

(51) Int. Cl.
  *G06F 16/44*   (2019.01)
  *G06Q 50/26*   (2012.01)
  *G06Q 50/18*   (2012.01)

(56) References Cited

U.S. PATENT DOCUMENTS

| | | |
|---|---|---|
| 2006/0026102 A1 | 2/2006 | Ryan, Jr. |
| 2011/0184935 A1 | 7/2011 | Marlin |
| 2013/0179415 A1 | 7/2013 | Auvenshine et al. |
| 2013/0198196 A1 | 8/2013 | Myslinski |
| 2016/0286156 A1 | 9/2016 | Kovac |
| 2018/0189913 A1 | 7/2018 | Knopp et al. |
| 2018/0278504 A1 | 9/2018 | Alazraki et al. |
| 2020/0234611 A1* | 7/2020 | Voorhees ................. G09B 7/06 |
| 2021/0191963 A1 | 6/2021 | Walton et al. |
| 2021/0263965 A1 | 8/2021 | Li et al. |

OTHER PUBLICATIONS

Spadaro, "Event correlation for detecting advanced multi-stage cyber-attacks," Delft University of Technology, 2013, pp. 1-139.
Singh et al., "Video content authentication techniques: a comprehensive survey," Multimedia Systems, 2017, vol. 24, No. 2, pp. 211-240.

* cited by examiner

DETERMINING INCONSISTENCIES IN DIGITAL EVIDENCE

The present application is a continuation of U.S. patent application Ser. No. 16/358,544, filed Mar. 19, 2019, the entire contents of which are hereby incorporated by reference.

BACKGROUND OF THE INVENTION

When an incident (for example, a crime, automobile accident, fire, or the like) occurs, numerous pieces of evidence are gathered. Often, this evidence is used to create an incident record in, for example, a records management system (RMS). The actual pieces of evidence and the incident records are used by law enforcement, legal counsel, and other users to analyze and prosecute a case associated with the incident. Steps in a life cycle of a case, each step defined by which users have control of evidence is sometimes referred to as a chain of evidence. Various types of evidence may be gathered from a variety of sources (for example, video evidence from body-worn cameras, video from CCTV cameras, written summaries prepared by first responders, smart telephone video from passersby, witness accounts, physical evidence, and other evidence). Sometimes there are inconsistencies in the evidence included in the incident record.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
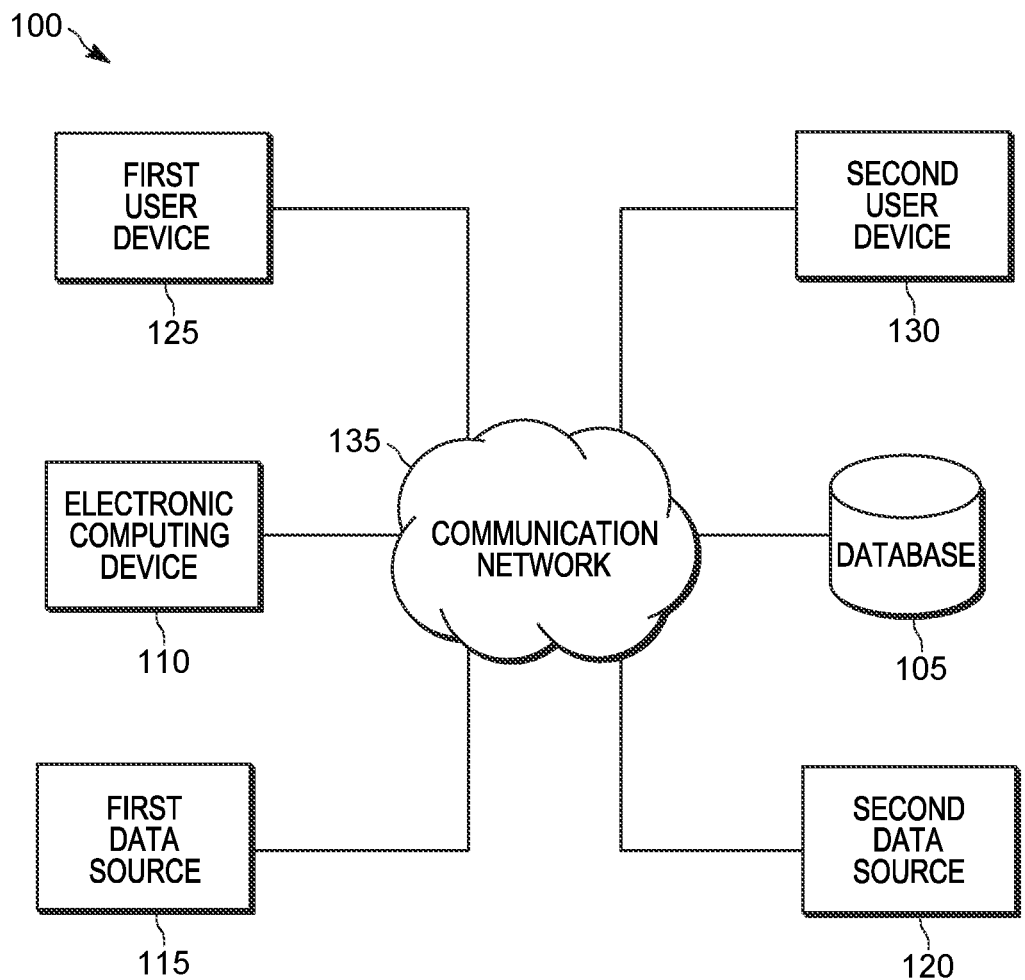
FIG. 1 is a block diagram of a system for prioritizing and resolving inconsistencies in digital evidence in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

As described above, incident records often include different types of data (evidence) and inconsistencies sometimes exist between these types of data. Studies have shown that inconsistencies in incident records cause users (for example, law enforcement officers) to spend a large amount of time reviewing, for example, video and comparing video records to their reports to discover inconsistencies. Eliminating inconsistencies is important to ensure that cases are not dismissed or delayed and that downstream users in a chain of evidence are allowed timely access to data without having to redo work due to inconsistencies. Thus, it would be useful to automatically discover and notify users of inconsistencies in evidence to improve the accuracy and functioning of record management systems and databases. Among other things, reducing inconsistencies may reduce the amount of time users spend reviewing evidence and redoing work, which in turn may reduce the processing power and memory resources consumed by the record management system. Additionally, reducing inconsistencies increases the speed of providing accurate information.

Inconsistencies may arise due to differences between witness accounts. For example, an inconsistency occurs when a distraught victim unintentionally provides an incorrect description of a suspect that differs from the description provided by other witnesses. In another example, an inconsistency occurs when an officer's incident report indicates that contraband was discovered in the back seat of a car, but video footage shows that the contraband was retrieved from the front seat of the car. In yet another example, an inconsistency occurs when an officer's incident report indicates that a suspect was wearing a red shirt, video footage from a body-worn camera footage indicates that the suspect was wearing a blue shirt.

The evidence, or more broadly, information or data collected is part of a digital chain of evidence (which may include various databases and data stores). As noted, inconsistencies in the evidence may be difficult to detect and resolve. Additionally, inconsistencies have different priorities based on the potential impact an inconsistency has on a case (for example, a legal case prosecuting an alleged criminal), the type of incident the inconsistency is associated with (for example, homicide as opposed to petty theft), and the like. For example, an inconsistency regarding the color of a shirt a suspect was wearing while committing a crime is a minor inconsistency but an inconsistency regarding who began a physical assault is an important inconsistency. When an inconsistency in the evidence in an incident record is detected, it is important that appropriate actions are taken to ensure that the inconsistency is resolved to improve accuracy, improve the speed of retrieving accurate information, and reduce potential negative consequences to a case. For example, if the inconsistency does not have a high priority it may be desirable to allow a detective access to the incident record but if the inconsistency has a high priority it may be desirable to block a detective from accessing the incident record until the inconsistency is resolved. To ensure that an inconsistency is resolved, it is important to notify the appropriate users of the inconsistency, for example, users who created or uploaded the inconsistent data (the originators of the inconsistent data), users who are identified in the inconsistent data, or users who accessed the inconsistent data. Therefore, a system which not only detects inconsistencies in data included in an incident record but also determines actions to take based on the determined importance (i.e., priority) of the detected inconsistency and the appropriate users to inform to resolve the detected inconsistency would be beneficial.

Embodiments described herein provide, among other things, a method and system for prioritizing and resolving inconsistencies in digital evidence.

One example embodiment provides a system for prioritizing and resolving inconsistencies in digital evidence. The system includes a database containing a first type of data including electronically stored multimedia data related to an incident record and a second type of data including electronically stored first responder notes or reports related to the incident record. The system also includes an electronic computing device including an electronic processor. The electronic processor is configured to receive the first type of data and the second type of data from the database, determine an inconsistency between the first type of data and the second type of data, and determine an incident type from the incident record. The electronic processor is also configured to determine, by accessing one or both of an incident type mapping and a machine learning model using the determined incident type, whether a priority of the determined inconsistency meets an electronically stored threshold case impact level. When the priority of the inconsistency meets the stored threshold case impact level, the electronic processor is configured to take a first notification action and when the priority of the inconsistency does not meet the stored threshold case impact level, the electronic processor is configured to take a second notification action different from the first.

Another example embodiment provides a method of prioritizing and resolving inconsistencies in digital evidence. The method includes receiving, with an electronic processor, a first type of data including electronically stored multimedia data related to an incident record and a second type of data including electronically stored first responder notes or reports related to the incident record from a database. The method also includes determining an inconsistency between the first type of data and the second type of data, determining an incident type from the incident record, and determining, by accessing one or both of an incident type mapping and a machine learning model using the determined incident type, whether a priority of the determined inconsistency meets an electronically stored threshold case impact level. The method further includes when the priority of the inconsistency meets the stored threshold case impact level, taking a first notification action and when the priority of the inconsistency does not meet the stored threshold case impact level, taking a second notification action different from the first.

FIG. 1 is a block diagram of a system 100 for prioritizing and resolving inconsistencies in digital evidence. In the example shown, the system 100 includes a database 105, an electronic computing device 110, a first data source 115 and a second data source 120 (referred to herein collectively as the data sources 115,120), and a first user device 125 and a second user device 130 (referred to herein collectively as the user devices 125,130). The database 105, electronic computing device 110, data sources 115, 120, and user devices 125, 130 are communicatively coupled via a communication network 135. The communication network 135 is an electronic communications network including wireless and/or wired connections. The communication network 135 may be implemented using a variety of one or more networks including, but not limited to, a wide area network, for example, the Internet; a local area network, for example, a Wi-Fi network, or a near-field network, for example, a Bluetooth™ network. Other types of networks, for example, a Long Term Evolution (LTE) network, a Global System for Mobile Communications (or Groupe Spécial Mobile (GSM)) network, a Code Division Multiple Access (CDMA) network, an Evolution-Data Optimized (EV-DO) network, an Enhanced Data Rates for GSM Evolution (EDGE) network, a 3G network, a 4G network, a 5G network, and combinations or derivatives thereof may also be used.

It should be understood that the system 100 may include different numbers of user devices and that the two user devices 125, 130 included in FIG. 1 are purely for illustrative purposes. It should also be understood that the system 100 may include different numbers of data sources and that the two data sources 115, 120 included in FIG. 1 are purely for illustrative purposes. It should also be understood that the system 100 may include a different number of electronic computing devices than the number of electronic computing devices illustrated in FIG. 1 and the functionality described herein as being performed by the electronic computing device 110 may be performed by a plurality of electronic computing devices.

In the embodiment illustrated in FIG. 1, the electronic computing device 110 is, for example, a server that is configured to prioritize and resolve inconsistencies in digital evidence. In the embodiment illustrated in FIG. 1, the user devices 125, 130 are electronic devices (for example, a smart telephone, a laptop computer, a desktop computer, a smart wearable, or other type of portable electronic device configured to operate as described herein). Each of the user devices are configured to send and receive information from the database 105. Likewise, each of the data sources 115, 120 are configured to send information to the database 105. A data source may be for example, a camera, a microphone, or other type of sensor configured to collect data regarding an incident. A data source of the plurality of data sources 115, 120 may be mounted or stationary, for example, a data source may be a body-worn camera worn by a police officer, a camera installed in a vehicle, or a camera mounted on a wall of a building. It should be noted that each of the user devices 125, 130 may be any one of the above mentioned options regardless of which of the above mentioned options are used for the other user devices in the system 100. For example, in one embodiment the first user device 125 may be a smart telephone while the second user device 130 may be a smart wearable. It should also be noted that each of the data sources 115, 120 may be any one of the above mentioned options regardless of which of the above mentioned options are used for the other data sources are in the system 100. For example, the first data source 115 may be a camera while the second data source 120 may be an infrared sensor. Additionally, in some embodiments, the functionality described herein as being performed by a data source is instead performed by a user device. In some embodiments, the system 100 does not include data sources and instead relies on user devices to perform the functionality of data sources.

Figure 2:
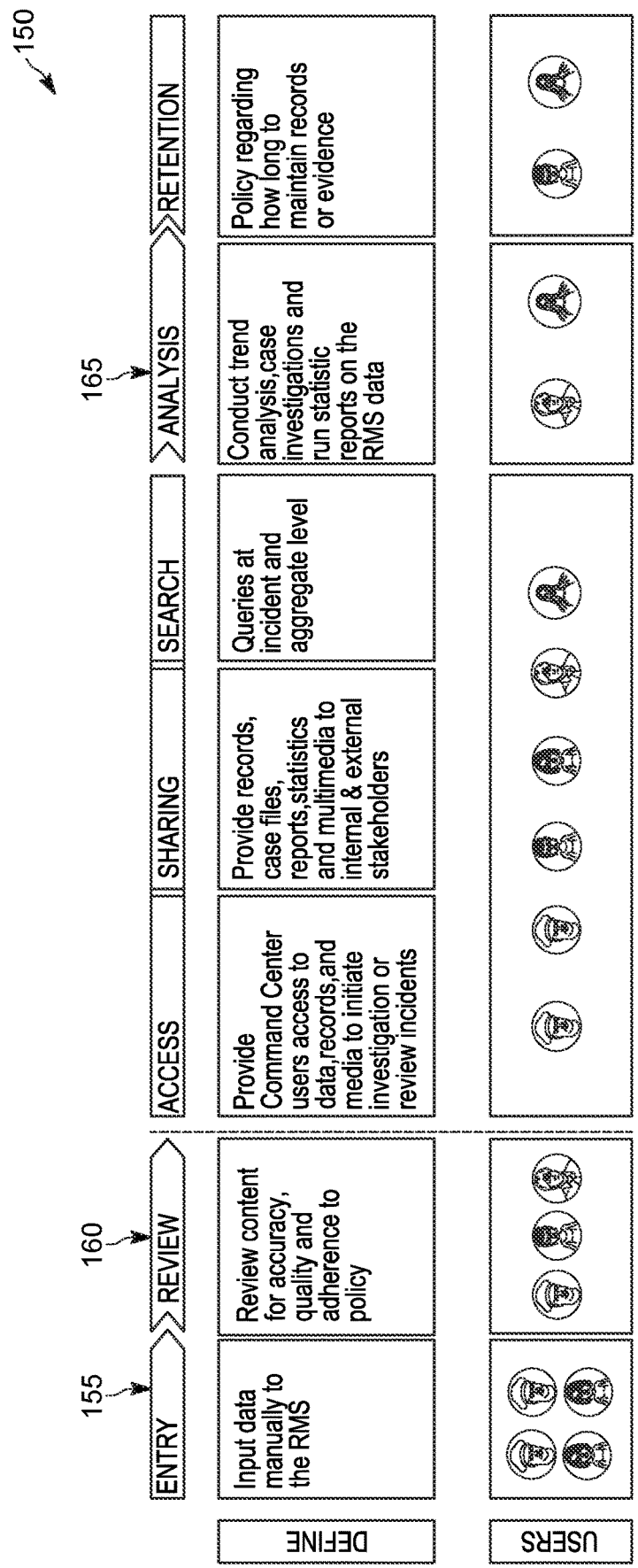
FIG. 2 is an illustrative example of a chain of evidence.

FIG. 2 is an illustrative example of a chain of evidence 150. As illustrated in FIG. 2, the chain of evidence 150 includes a plurality of steps that begin when data (evidence) is added to a records management system and ends when a decision is made as to how long the data will be stored in the records management system. Different users access the data at different steps in the chain of evidence 150. For example, police officers access the data at the entry step 155 and review step 160 but detectives access the data at the analysis step 165. Inconsistencies may occur at a number of steps in the chain of evidence 150. In one example, an inconsistency may occur at the entry step 155 when a police officer enters a report that contradicts received video evidence. In another example, an inconsistency may occur when a detective submits a report after reviewing the evidence at the analysis step 165. An inconsistency at one step may be the cause of an inconsistency at another step in the chain of evidence 150. For example, there may be an inconsistency between a police officer's report and video evidence. If, at a later step in the chain if evidence 150, a detective relies on the police officer's report to create an investigation report, the investigation report may include the same inconsistency as the police officer's report.

Figure 3:
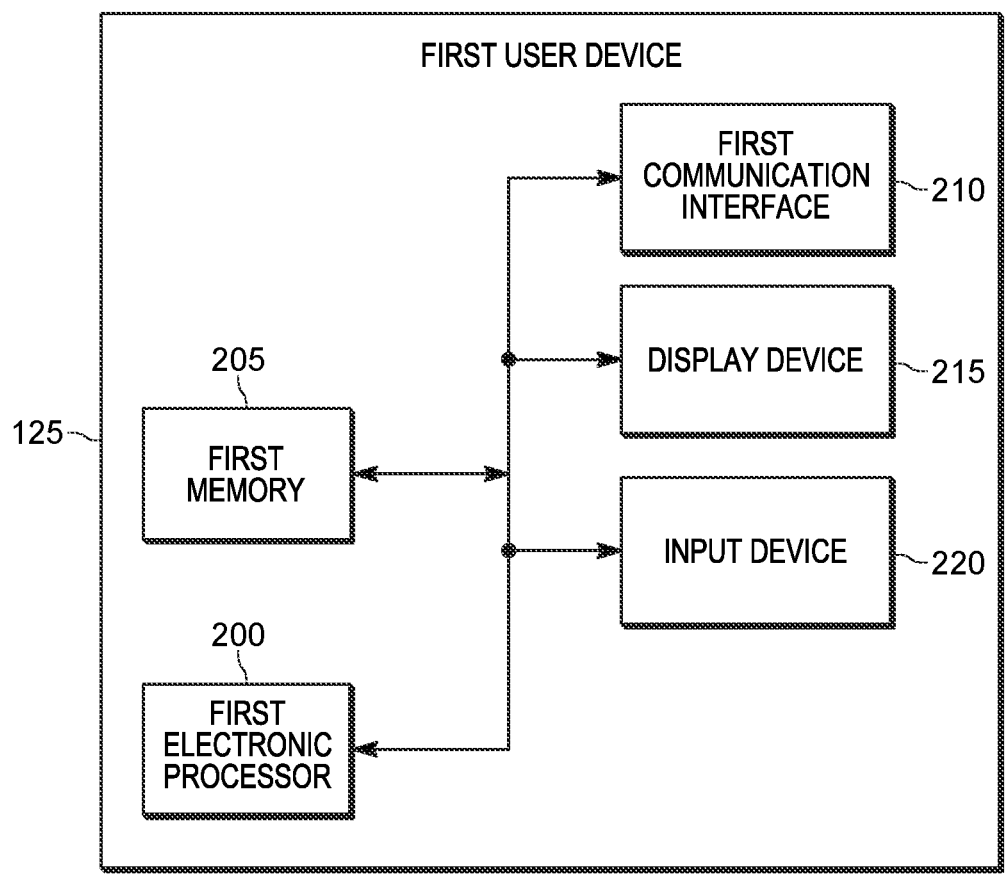
FIG. 3 is a block diagram of a user device of the system of FIG. 1 in accordance with some embodiments.

FIG. 3 is a block diagram of the first user device 125 included in the system 100. In the example illustrated, the first user device 125 includes a first electronic processor 200 (for example, a microprocessor, application-specific integrated circuit (ASIC), or another suitable electronic device), a first memory 205 (a non-transitory, computer-readable storage medium), a first communication interface 210 (including, for example, a transceiver for communicating over one or more networks (for example, the network 135)), a display device 215, and an input device 220. The first memory 205 may include, for example, a hard disk, a CD-ROM, an optical storage device, a magnetic storage device, a read only memory (ROM), a programmable read only memory (PROM), an erasable programmable read only memory (EPROM), an electrically erasable programmable read only memory (EEPROM), a Flash memory, or a combination of the foregoing. The first electronic processor 200, first communication interface 210, first memory 205, display device 215, and input device 220 communicate wirelessly or over one or more communication lines or buses.

The display device 215 may be, for example, a touchscreen, a liquid crystal display ("LCD"), a light-emitting diode ("LED") display, an organic LED ("OLED") display, an electroluminescent display ("ELD"), and the like. The input device 220 may be, for example, a touchscreen (for example, as part of the display device 215), a mouse, a trackpad, a microphone, a camera, or the like. It should be understood that the first user device 125 may include more, fewer, or different components than those components illustrated in FIG. 3. For example, the first user device 125, while illustrated as having only one input device, may include multiple input devices and may include an output device such as speakers. Also, it should be understood that, although not described or illustrated herein, the second user device 130 may include similar components and perform similar functionality as the first user device 125.

Figure 4:
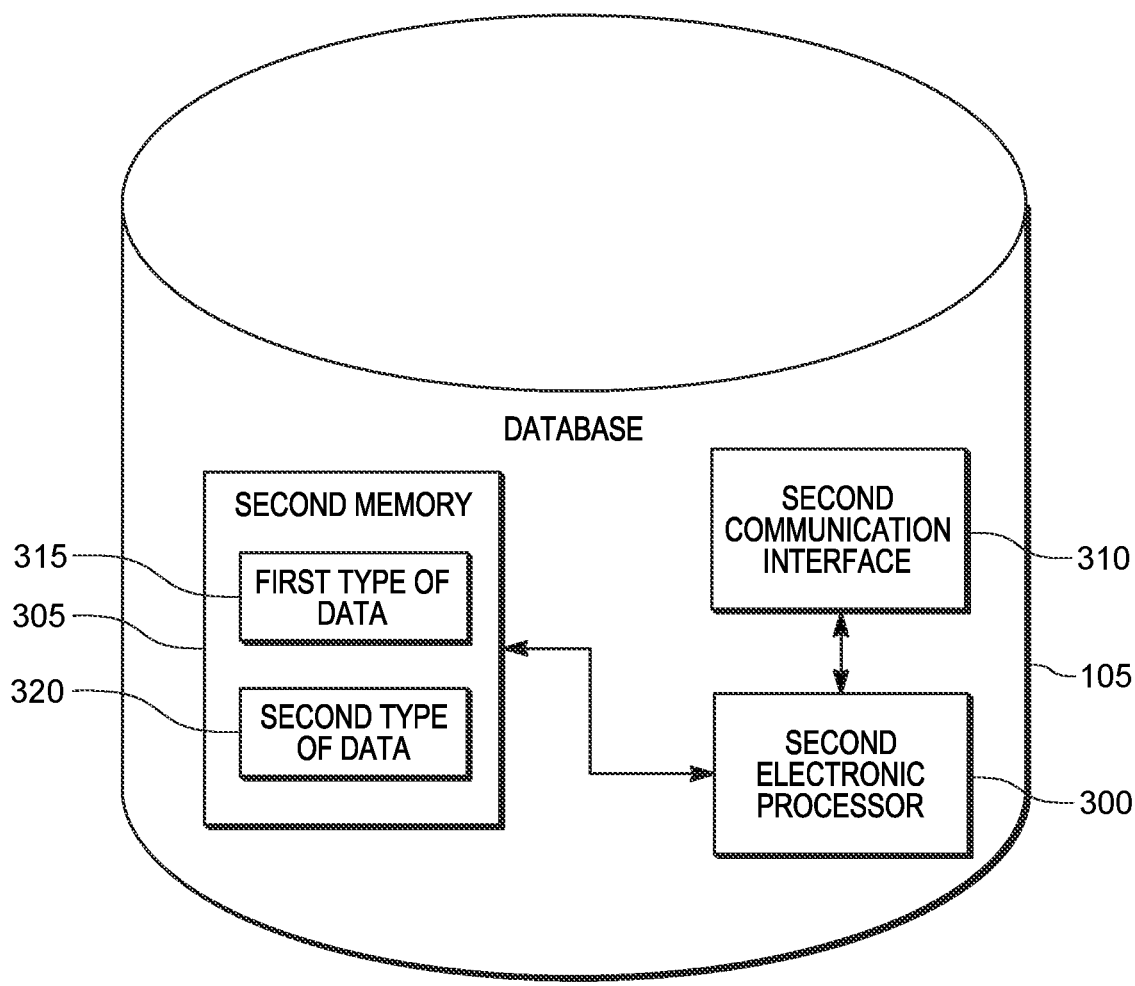
FIG. 4 is a block diagram of a database of the system of FIG. 1 in accordance with some embodiments.

FIG. 4 is a block diagram of the database 105 included in the system 100 of FIG. 1. In the example illustrated, the database 105 includes a second electronic processor 300 (for example, a microprocessor, application-specific integrated circuit (ASIC), or another suitable electronic device), a second communication interface 310 (including, for example, a transceiver for communicating over one or more networks (for example, the communication network 135)), and a second memory 305 (a non-transitory, computer-readable storage medium). The second memory 305 may include, for example, the types of memory described with respect to the first memory 205. The second electronic processor 300, second communication interface 310, and second memory 305 communicate wirelessly or over one or more communication lines or buses. It should be understood that the database 105 may include more, fewer, or different components than those components illustrated in FIG. 4.

In the embodiment illustrated in FIG. 4, the second memory 305 includes a first type of data 315 and a second type of data 320. The first type of data 315 may be electronically stored multimedia data related to an incident record. For example, the first type of data 315 is video data received from a video camera (for example, a body-worn camera) associated with a first responder who witnessed the incident. The second type of data 320 may be electronically stored first responder notes or reports related to the incident record. For example, the second type of data 320 is a text document received from the user device 125 and created by a first responder to record their observations with regard to the incident. In some embodiments, both the first type of data 315 and the second type of data 320 may be electronically stored first responder notes or reports. It should be understood that the first type of data 315 and the second type of data 320 relate to the same incident record. In some embodiments, the second memory 305 includes numerous types of data related to numerous incident records and that the first type of data 315 and the second type of data 320 are purely for illustrative purposes. Additionally, it should be noted that each type of data may be associated with a plurality of incident records.

In some embodiments, the types of data stored in the second memory 305 of the database 105 are tagged with one or more tags. Each tag includes a unique identifier for an incident record that the type of data is associated with. In some embodiments, the second electronic processor 300 receives an indication of the incident record when the second electronic processor 300 receives the data. For example, the second electronic processor 300 may receive, from the first user device 125, the second type of data and, for example, a unique number or unique name of an incident record that the second type of data is associated with. In other embodiments, the second electronic processor 300 automatically determines an incident record that data is associated with. For example, the second electronic processor 300 may receive the first type of data from the first data source 115. Based on when the first data source 115 captured the first type of data, a location at which the first data source 115 captured the first type of data, or both, the second electronic processor 300 determines an incident record the second type of data 320 is associated with and tags the second type of data 320 with the unique identifier of the associated incident record.

In other embodiments, each incident record is associated with a location in the second memory 305 and data associated with an incident record is stored in the location associated with the incident record in the second memory 305.

Figure 5:
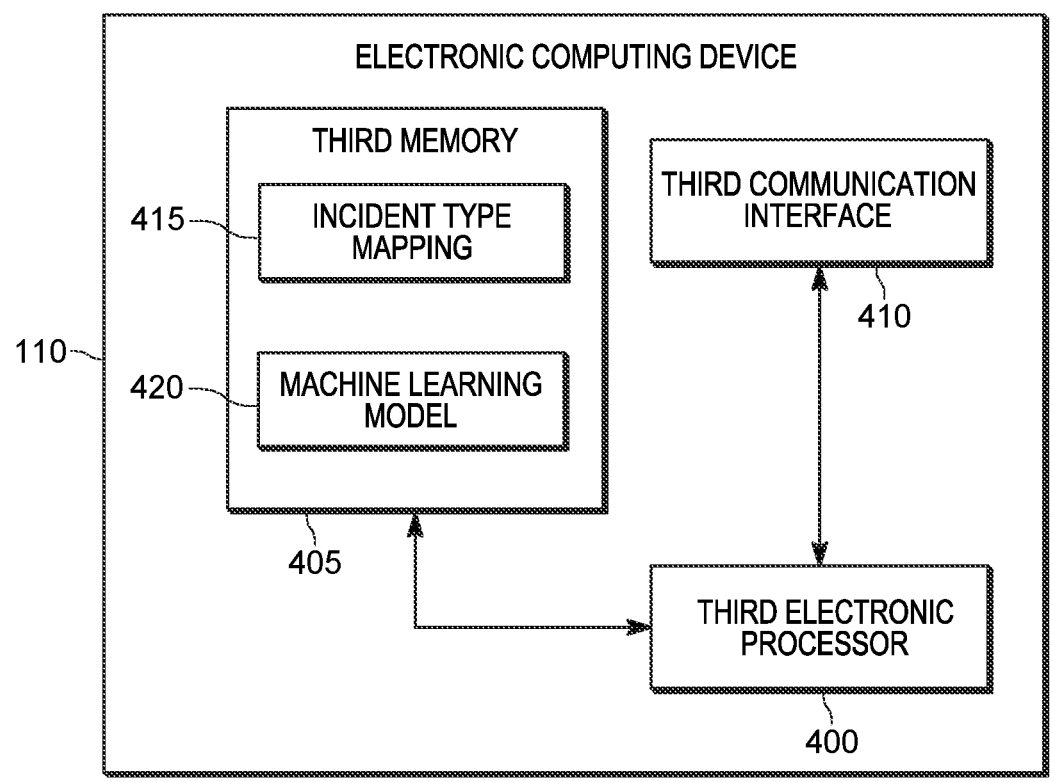
FIG. 5 is a block diagram of an electronic computing device of the system of FIG. 1 in accordance with some embodiments.

FIG. 5 is a block diagram of the electronic computing device 110 included in the system 100 of FIG. 1. In the example illustrated, the electronic computing device 110 includes a third electronic processor 400 (for example, one or more of the electronic devices mentioned previously), a third communication interface 410 (including, for example, a transceiver for communicating over one or more networks (for example, the communication network 135)), and a third memory 405 (a non-transitory, computer-readable storage medium). The third memory 405 may include, for example, the types of memory described with respect to the first memory 205. The third electronic processor 400, third communication interface 410, and third memory 405 communicate via one or more of the mechanisms mentioned previously. It should be understood that the electronic computing device 110 may include more, fewer, or different components than those components illustrated in FIG. 5.

The third memory 405 illustrated in FIG. 5 includes an incident type mapping 415 and a machine learning model 420. The incident type mapping 415 maps each type of incident to an associated priority. It should be noted that the third memory 405 may include multiple mappings that are used in combination with the incident type mapping 415 to determine the priority of an inconsistency. For example, the third memory 405 may include an originator mapping, a role type mapping, a resolution time mapping, a severity mapping, and an inconsistency impact mapping. In some embodiments, each of the above mentioned mappings are used alone or in combination to calculate a priority of the inconsistency using techniques such as Bayes Theorem.

The machine learning model 420 may use, for example, logistic regression, Bayesian multivariate linear regression, or other appropriate forms of probabilistic modeling to determine a priority associated with an inconsistency. In some embodiments, weights included in the machine learning model 420 are initially set by a user but are later updated based on user feedback to optimize prioritization. In some embodiments, the user feedback includes direct feedback from users who resolve the inconsistency. For example, the users may provide feedback in the form of responding to a questionnaire. In some embodiments, the user feedback includes a time a user downstream from an originator of inconsistent data in a chain of evidence spends resolving an inconsistency. It should be noted that the weights of the machine learning model 420 may be adjusted manually by a user, instead of or in addition to being updated based on user feedback.

The incident type mapping 415 and the machine learning model 420 may be used alone or in combination to determine a priority associated with an inconsistency. For example, the incident type mapping 415 and the machine learning model 420 may each determine a priority associated with an inconsistency and when the difference between the determined priorities is greater than a predetermined threshold, the incident type mapping 415 and the machine learning model 420 recalculate the priority.

Figure 6:
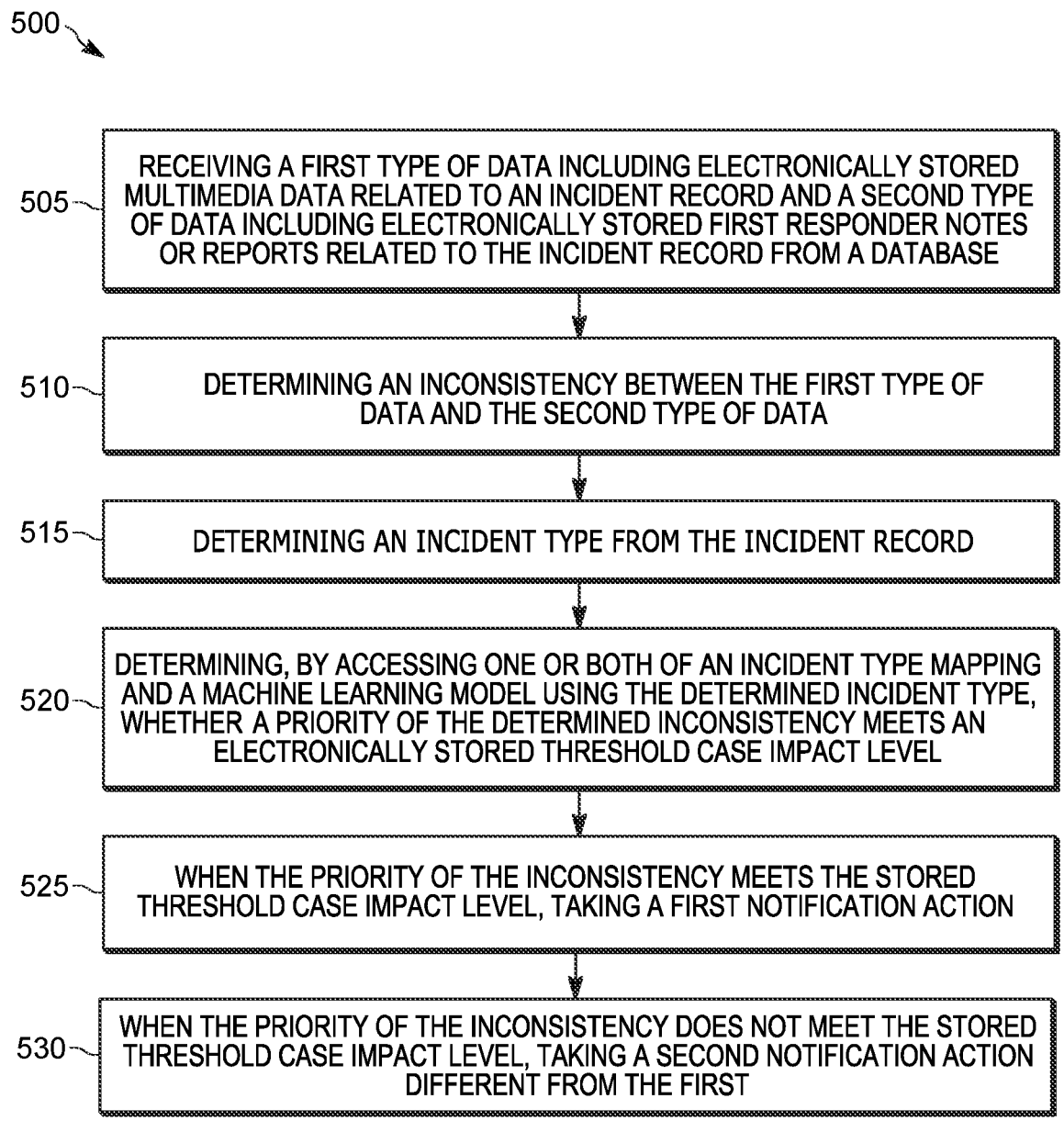
FIG. 6 is a flowchart of a method of prioritizing and resolving inconsistencies in digital evidence in accordance with some embodiments.

FIG. 6 illustrates one example of a method 500 of prioritizing and resolving inconsistencies in digital evidence. The method 500 begins at block 505 when the third electronic processor 400 receives the first type of data 315 and the second type of data 320. The first type of data 315 may include electronically stored multimedia data related to an incident record (for example, which may have been generated by first data source 115 as video from a body-worn camera and tagged with a unique identifier of the incident record). The second type of data 320 may include electronically stored first responder notes or reports (for example, which may have been generated by an officer using first user device 125 and tagged with the unique identifier of the incident record) related to the incident record from the database 105. The third electronic processor 400 may receive data by requesting data from the database 105 that is associated with the incident record. Using the unique identifier associated with the incident record, the second electronic processor 300 retrieves from second memory 305 the types of data tagged with the unique identifier or stored in a memory location associated with the unique identifier and sends the types of data tagged with the unique identifier to the third electronic processor 400.

At block 510, the third electronic processor 400 determines an inconsistency between the first type of data 315 and second type of data 320. For example, the third electronic processor 400 may use techniques such as optical character recognition (OCR), image analysis (for example, facial recognition software, object detection software, and the like), audio analysis, and the like to detect inconsistencies between the first type of data 315 and the second type of data 320. In one example, when the first type of data 315 is a video recording of a stake out (for example, captured by a dashboard camera in a police vehicle) and the second type of data 320 is a police officer's account of the stake out, the third electronic processor 400 may utilize optical character recognition to determine one or more times the police officer's account mentions an event occurring. For example, the third electronic processor 400 may determine a first time when a police officer recorded seeing a suspect's car and a second time when a police officer recorded seeing the suspect commit a crime, for example, exchanging money for illegal drugs. The third electronic processor 400 may use image analysis to determine one or more frames of the video recording captured at the first time and one or more frames of the video recording recorded at the second time. If the suspect's car is not included in the one or more frames of the video recording captured at the first time or the one or more frames of the video recording recorded at the second time does not show the suspect exchanging money for illegal drugs, the third electronic processor 400 detects an inconsistency (or determines the existence of an inconsistency). In another example, when the first type of data 315 is a video recording of a robbery (for example, captured by a body-worn camera associated with a police officer) and the second type of data 320 is the police officer's account of the robbery. When the police officer's account of the robbery states a shirt worn by a person suspected of committing the robbery is red while the video recording shows a shirt worn by a person suspected of committing the robbery as blue, the third electronic processor 400 detects an inconsistency.

In yet another example, when the first type of data 315 is a video recording of an assault with a deadly weapon (for example, captured by a body-worn camera associated with a police officer) and the second type of data 320 is the police officer's account of the assault. When the police officer's account of the assault states that a first suspect shot first while the video recording shows that a second suspect shot first, the third electronic processor 400 detects an inconsistency.

At block 515, the third electronic processor 400 determines an incident type from the incident record. The incident type is, for example, the type of incident associated with the incident record that the first type of data 315 and second type of data 320 are related to. For example, the incident type may be one of a homicide, an assault, a petty theft, an act of vandalism, and the like. Different incident types are related to different priorities. In general, an inconsistency related to a high priority incident type is considered more important to address than an inconsistency related to a low priority incident type.

At block 520, the third electronic processor 400 determines, by accessing one or both of the incident type mapping 415 and the machine learning model 420 stored in the third memory 405 of the electronic computing device 110 using the determined incident type, whether an initial priority of the determined inconsistency meets an electronically stored threshold case impact level (for example, a predetermined value stored in the third memory 405).

In some embodiments, the initial priority associated with an inconsistency may be a number selected from a scale of one to one hundred (1-100), where one is the lowest initial priority and one hundred is the highest initial priority. In one example, if the incident type of the incident record that the inconsistency has been determined in is petty theft, an initial priority of twenty-five (25) may be assigned to the inconsistency. In another example, if the incident type of the incident record that the inconsistency has been determined in is homicide, an initial priority of ninety (90) may be assigned to the inconsistency. In other embodiments, the initial priority associated with an inconsistency may be a level encompassing a range of values. For example, possible initial priorities for an inconsistency may be any value from 0 to 1 and a first level (the lowest initial priority) may be assigned values 0 to 0.33, a second level may be assigned values 0.34 to 0.66, and a third level (the highest initial priority) may be assigned values 0.67 to 1. In one example, the third electronic processor 400 may assign an inconsistency associated with an incident type of vandalism a value of 0.35 and therefore assigns the inconsistency to the second level.

In some embodiments, in addition to using one or both of the incident type mapping 415 and the machine learning model 420, the third electronic processor 400 uses additional contextual information from the first or second data types to determine if a modified priority of the determined inconsistency meets an electronically stored threshold case impact level. The additional contextual information includes at least one selected from the group comprising an originator of the first type of data (stored in the originator mapping), an originator of the second type of data (stored in the originator mapping), a role (for example, police officer, forensic specialist, and the like) of the originator of the first type of data (stored in the role type mapping), a role of the originator of the second type of data (stored in the role type mapping), whether the first type of data, the second type of data, or both are associated with more than one incident record, when an inconsistency occurs in a chain of evidence, a resolution time of the inconsistency (stored in the resolution time mapping), a severity associated with the incident (stored in a severity mapping), and an impact of the inconsistency (stored in the inconsistency impact mapping).

In some embodiments, the originator mapping specifies a multiplier for the modified priority of the inconsistency based on an originator of a type of data (for example, the first type of data 315 and the second type of data 320). For example, if the originator of the second type of data 320 is a police officer who is on probation, the third electronic processor 400 may significantly increase the modified priority, for example increase the modified priority by 50%-75%.

In some embodiments, the role type mapping specifies a multiplier for the modified priority of the inconsistency based on a role of an originator of a type of data (for example, the first type of data 315 and the second type of data 320). For example, the first type of data 315 may originate from a body-worn camera of an arresting officer. Therefore, the role of the originator of the first type of data 315 is arresting officer. When the role of the originator of the first type of data 315 is arresting officer, the third electronic processor 400 may significantly increase the modified priority, for example increase the modified priority by, for example, 50%-75%. In another example, when a role of an originator of the second type of data 320 is a trainee and an inconsistency is detected in the notes of the trainee, the third electronic processor 400 may only slightly increase the modified priority of the determined inconsistency (for example, the third electronic processor 400 may increase the modified priority by 1%-10%) or not change the modified priority at all (for example, the third electronic processor 400 may increase the modified priority by 0%).

In some embodiments, the resolution time mapping specifies a multiplier for the modified priority of the inconsistency based on the amount of time it takes users in, for example, the chain of evidence 150 to resolve an inconsistency. For example, the third electronic processor 400 significantly increases the modified priority of a determined inconsistency by, for example, 50%-100% when the inconsistency takes a user a long time to resolve (for example, when the user has to review a large quantity of video footage in detail in order to resolve an inconsistency). On the other hand, the third electronic processor 400 may only slightly increase the modified priority of the determined inconsistency (for example, the third electronic processor 400 may increase the modified priority by 1% to 10%) or not change the modified priority at all (for example, the third electronic processor 400 may increase the modified priority by 0%) when the inconsistency takes a user a small amount of time to resolve.

In some embodiments, for each incident type, the severity mapping specifies a multiplier for the modified priority of the inconsistency based on a severity of the incident. For example, the third electronic processor 400 significantly increases the modified priority of a determined inconsistency by, for example, 50%-100% when the incident type is homicide and the severity of the incident is first degree homicide. On the other hand, the third electronic processor 400 may only slightly increase the modified priority of the determined inconsistency (for example, the third electronic processor 400 may increase the modified priority by 1%-10%) or not change the modified priority at all (for example, the third electronic processor 400 may increase the modified priority by 0%) when the incident type is homicide and the severity of the incident is third degree homicide.

In some embodiments, for each incident type, the inconsistency impact mapping specifies a multiplier for the inconsistency based on the impact of the inconsistency type. Inconsistency types having a high impact on a case are defined herein as inconsistency types which affect users downstream in a chain of evidence (for example, inconsistencies that affect the work of a detective or legal counsel). In one example, for a homicide incident, the inconsistency impact mapping may state that an inconsistency regarding a suspect's clothing description has a high impact and the third electronic processor 400 may significantly increase the modified priority of the inconsistency by, for example, 50%-100%. In another example, for a homicide incident, the inconsistency impact mapping may state that an inconsistency regarding a suspect's gait (for example, whether a suspect was running or walking up to a house) has a low impact and the third electronic processor 400 may only slightly increase the modified priority (by, for example, 1%-10%) or not change the modified priority at all. In yet another example, for a petty theft incident type, an inconsistency type mapping may state that both an inconsistency regarding a suspect's clothing description and an inconsistency regarding a suspect's gait may have similarly low impact and the third electronic processor 400 only slightly increases the modified priority (by, for example, 1%-10%) or does not change the modified priority at all.

In some embodiments, when the first type of data, the second type of data, or both are associated with more than one incident record, the third electronic processor 400 increases the modified priority of the determined inconsistency. For example, the third electronic processor 400 may increase the modified priority of the inconsistency by 20% if the first type of data 315 is associated with two incident records and increase the modified priority of the inconsistency by 30% if the first type of data 315 is associated with three incident records. The third electronic processor 400 may determine the number of incident records by determining the number of tags associated with the first type of data 315 in the database 105.

In some embodiments, the third electronic processor 400 significantly increases the modified priority of inconsistencies that occur early in a chain of evidence (for example, the chain of evidence 150) and only slightly increases the modified priority of inconsistencies that occur late in the chain of evidence 150 (by, for example, 1%-10%) or does not change it at all. For example, for an inconsistency in evidence that occurred at the entry step 155 of the chain of evidence 150, the third electronic processor 400 may increase the modified priority by, for example, 75%-100%. In contrast, for an inconsistency that occurred at analysis step 165, the third electronic processor 400 may increase the modified priority by, for example, 1%-20%.

It should be noted that, in some embodiments, instead of including multipliers the mappings described above may include values. In some embodiments, rather than increasing the modified priority by a percentage, the modified priority may be increased by a value, for example, a number between 0 and 1.

At block 525, when the initial or modified priority (the priority) of the inconsistency meets or exceeds the stored threshold case impact level, the third electronic processor 400 takes a first notification action. At block 530, when the initial or modified priority of the inconsistency does not meet the stored threshold case impact level, the third electronic processor 400 takes a second notification action different from the first. In one example of a notification action, the third electronic processor 400 adds an originator of the first type of data and an originator of the second type of data to a group communication regarding the inconsistency and sends a notification to the group communication regarding the inconsistency. In another example of a notification action, the third electronic processor 400 may identify a first user from one of an originator of the first type of data, an originator of the second type of data, a user in the first type of data, and a user in the second type of data. A user in the first type of data or second type of data may be, for example, a user included in video footage, a user whose name is mentioned in a report, and the like. The third electronic processor 400 identifies a second user as a user in the first type of data or a user in the second type of data. The third electronic processor 400 adds the first user and the second user to a group communication regarding the inconsistency and sends the notification to the group communication. Group communications may be accessed by users via the user devices 125, 130 of the system 100. For example, the notification may be displayed to the originator of the first type of data 315 via the first user device 125 and displayed to the originator of the second type of data 320 via the second user device 130.

In some embodiments, the third electronic processor 400 takes a first notification action by sending a notification to a group communication (for example, the group communication including an originator of the first type of data 315 and an originator of the second type of data 320) and takes a second notification action by adding a notification to a queue of inconsistency notifications associated with the incident record. For example, when an initial or modified priority of a determined inconsistency meets the stored threshold case impact level, the third electronic processor 400 sends a notification to the group communication and when the initial or modified priority of the determined inconsistency does not meet the stored threshold case impact level, the third electronic processor 400 adds the determined inconsistency to the queue of inconsistencies. The queue of inconsistencies is accessed by users when the users wish to resolve one or more inconsistencies. In some embodiments, the third electronic processor 400 adds the notifications to the end of the queue. In other embodiments, the third electronic processor 400 adds the notifications to the queue based on the priority associated with the notifications (for example, notifications with a higher priority are added to the front of the queue are added to the back of the queue).

In some embodiments, the third electronic processor 400 takes a first notification action by blocking users following an originator of the first type of data and an originator of the second type of data in a chain of evidence associated with the incident record. The third electronic processor 400 takes a second notification action by sending a notification to a group communication (for example, the group communication including an originator of the first type of data 315 and an originator of the second type of data 320). For example, when an initial or modified priority of a determined inconsistency does not meet the stored threshold case impact level, the third electronic processor 400 sends a notification to a group communication and when the initial or modified priority of the determined inconsistency meets the stored threshold case impact level, the third electronic processor 400 blocks users following an originator of the first type of data and an originator of the second type of data in a chain of evidence associated with the incident record. Blocking users downstream in a chain of evidence prevents users accessing inconsistent data in the incident record that may negatively impact a case (for example, causing incorrect evidence to be presented in court). Once the inconsistency has been resolved, the blocked user's access to the first type of data and an originator of the second type of data is restored.

It should be understood that, in some embodiments, there are further types of notification actions which may be taken by the third electronic processor 400 than are described herein. For example, the third electronic processor 400 may send a notification regarding an inconsistency to an originator of the first type of data and an originator of the second type of data individually rather than send a notification to a group communication including an originator of the first type of data and an originator of the second type of data. It should also be understood that there are multiple different combinations of notification actions that may be performed by the third electronic processor 400 as a first notification action and a second notification action.

In some embodiments, the method 500 may be performed by the third electronic processor 400 continuously, periodically, upon receiving a request from a user, or whenever there is an update to the incident record.

Figure 7:
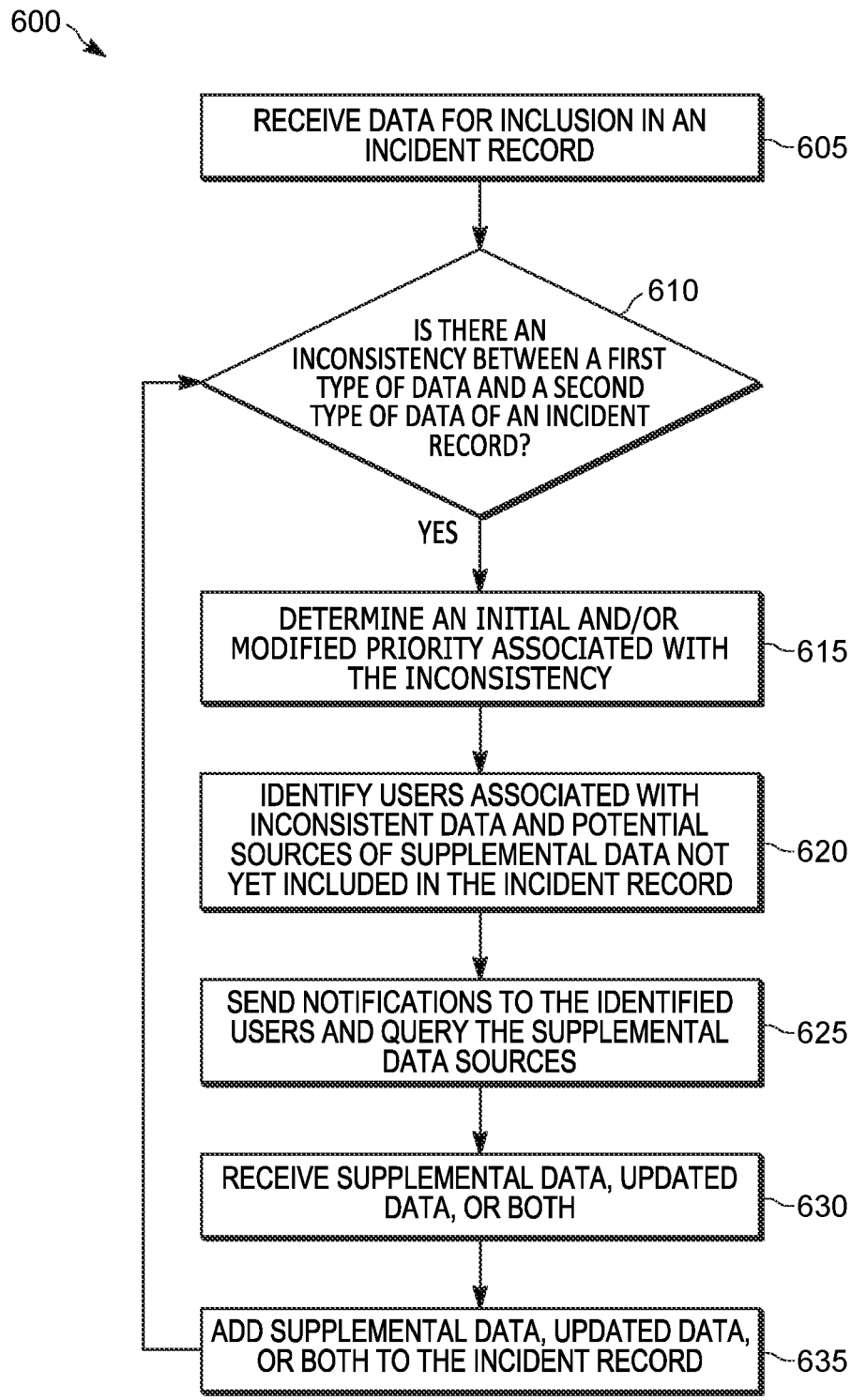
FIG. 7 is a flow chart of a method of resolving inconsistencies in digital evidence in accordance with some embodiments.

FIG. 7 is a flow chart of a method 600 of resolving inconsistencies in digital evidence. At block 605, the third electronic processor 400 receives data (evidence) for inclusion in an incident record. Similar to the method 500, at block 610, the third electronic processor 400 determines if there is an inconsistency between a first type of data and a second type of data included in the incident record. When an inconsistency is detected, at block 615, the third electronic processor 400 determines an initial and/or modified priority associated with the inconsistency, perhaps in a same or similar way as set forth with respect to FIG. 6 and method 500. At block 620, the third electronic processor 400 identifies users associated with the inconsistency. As described above, the identified users may include originators of the inconsistent data, users identified in the inconsistent data, and the like.

At block 620, the third electronic processor 400 is configured to identify sources of supplemental data not yet included in the incident record. At block 625, the third electronic processor 400 sends notifications to the identified users and queries or searches the identified sources for supplementary data associated with an inconsistency. Once the supplementary data is found the supplementary data is added to the incident record. For example, the third electronic processor 400 may search the database 105 for video footage of an incident that was captured from a different perspective than the video data already included in the incident record. The supplementary data may aid users in resolving the inconsistency.

At block 630, the third electronic processor 400 receives supplemental data from at least one identified source, updated data from at least one of the notified users, or both. At block 635, the third electronic processor 400 adds the updated data, supplemental data, or both to the incident record. In some embodiments, the third electronic processor 400 flags, tags, or otherwise marks the first type of data, the second type of data, or both as inconsistent in the stored record. For example, when the third electronic processor 400 receives updated data from the originator of the first type of data, the third electronic processor 400 flags the first type of data as inconsistent data. Once the third electronic processor 400 receives the updated data, supplemental data, or both, the third electronic processor 400 executes the method 600 again beginning at block 610. After data is marked or flagged as inconsistent, it is not considered by the third electronic processor 400 when the third electronic processor 400 executes the method 500.

In some embodiments, when multiple inconsistencies are discovered in an incident record, the third electronic processor 400 determines an order for resolving the inconsistencies. The determined order is related to when in a chain of evidence (for example, the chain of evidence 150) each inconsistency occurred. For example, an inconsistency in evidence that occurred at the entry step 155 of the chain of evidence 150 comes before an inconsistency that occurred at analysis step 165. The third electronic processor 400 may provide the order to users associated with one or more of the discovered inconsistencies (for example, the third electronic processor 400 sends the order to a group communication including the users) so that inconsistencies earlier in the chain of evidence with the potential to impact other subsequent inconsistencies are resolved first.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element preceded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (for example, comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A system for determining inconsistencies in digital evidence, the system comprising:
a first data source including electronically stored video data;
a second data source including an electronically stored first responder note or report; and
an electronic computing device including an electronic processor, the electronic processor configured to:
receive the video data from the first data source and receive the first responder note or report from the second data source,
determine that the video data and the first responder note or report both include information associated with a common incident,
determine an inconsistency between the video data and the first responder note or report by:
processing the first responder note or report to identify a characteristic of a first person or object of interest who was present at a first time during the common incident,
analyzing, with an image analysis engine, video frames within the video data that were captured at the first time during the common incident,
determining, based on analyzing the video frames, that a person or object of interest matching the characteristic of the first person or object of interest is not present in the video frames, and
in response to determining that a person or object of interest matching the characteristic of the first person or object of interest is not present in the video frames, determining the presence of the inconsistency between the video data and the first responder note or report,
in response to determining the presence of the inconsistency between the video data and the first responder note or report, provide a visual or audio notification indicating the inconsistency between the video data and the first responder note or report via a visual or audio output device;
in response to determining the presence of the inconsistency between the video data and the first responder note or report:
identify (i) users associated with inconsistent data and (ii) potential sources of supplemental data not yet included in an electronic incident record associated with the common incident,
transmit user notifications to respective user devices of the identified users,
query the potential sources of supplemental data,
receive supplemental data from a potential source of supplemental data, updated data from a user device, or both the supplemental data and the updated data,
add the supplemental data, the updated data, or both the supplemental data and the updated data to the electronic incident record to create a modified electronic incident record.

2. The system of claim 1, wherein the electronic processor is further configured to:
determine an incident type from an incident record related to the common incident;
determine, by accessing one or both of an incident type mapping and a machine learning model using the incident type, whether a priority of the inconsistency meets an electronically stored threshold case impact level; and
in response to the priority of the inconsistency meeting the electronically stored threshold case impact level, provide a first notification via the visual or audio output device.

3. The system of claim 2, wherein the electronic processor is further configured to:
in response to determining that the priority of the inconsistency does not meet the electronically stored threshold case impact level, provide a second notification via the visual or audio output device, the second notification being different than the first notification.

4. The system of claim 3, wherein the electronic processor is further configured to:
provide the first notification by sending the first notification to a group communication including an originator of the video data and an originator of the first responder note or report, wherein the group communication is accessible via a respective user device of each of the originators; and
provide the second notification by adding the second notification to a queue of inconsistency notifications associated with the incident record.

5. The system of claim 3, wherein the electronic processor is further configured to:
provide the first notification by blocking users following an originator of the video data and an originator of the first responder note or report in a chain of evidence associated with the incident record, wherein blocking users includes preventing a respective user device of each of the users from outputting the video data and the first responder note or report until the inconsistency is resolved; and
provide the second notification by sending the second notification to a group communication including the originator of the video data and the originator of the first responder note or report, wherein the group communication is accessible via a respective user device of each of the originators.

6. The system of claim 2, wherein the electronic processor is further configured to:
use additional contextual information from at least one of the group consisting of (i) the video data and (ii) the first responder note or report to determine whether the priority of the inconsistency meets the electronically stored threshold case impact level;
wherein the additional contextual information includes at least one of the group consisting of an originator of the video data, an originator of the first responder note or report, a role of the originator of the video data, a role of the originator of the first responder note or report, whether the video data, the first responder note or report, or both are associated with another incident record, a point in a chain of evidence at which the inconsistency occurs, a resolution time of the inconsistency, a severity associated with the incident, and an impact of the inconsistency.

7. The system of claim 1, wherein the electronic processor is configured to:
in response to determining the presence of the inconsistency between the video data and the first responder note or report, search at least one of the group consisting of the first data source, the second data source, and another data source for second video data of the common incident that is different from the video data already received by the electronic processor; and
add the second video data to an incident record of the common incident, wherein the second video data is configured to aid a user in resolving the inconsistency.

8. The system of claim 7, wherein the second video data was captured from a different perspective than the video data already received by the electronic processor.

9. The system of claim 1, wherein the electronic processor is configured to process, by utilizing optical character recognition, the first responder note or report to (i) identify the characteristic of the first person or object of interest and (ii) determine the first time; and
wherein the electronic processor is configured to determine, based on the first time, the video frames to analyze using the image analysis engine, wherein analyzing the video frames includes using facial recognition software, object detection software, or both facial recognition software and object detection software.

10. The system of claim 1, wherein the electronic processor is configured to:
determine multiple inconsistencies between the video data and the first responder note or report; and
determine an order for resolving the inconsistencies based on when in a chain of evidence that each inconsistency of the inconsistencies occurred, wherein the order for resolving the inconsistencies indicates that a first inconsistency earlier in the chain of evidence should be resolved before a second inconsistency later in the chain of evidence.

11. A method of operating an electronic computing device to determine inconsistencies in digital evidence, the method comprising:
receiving, with an electronic processor of the electronic computing device, electronically stored video data from a first data source;
receiving, with the electronic processor, an electrically stored first responder note or report from a second data source;
determining, with the electronic processor, that the video data and the first responder note or report both include information associated with a common incident;
determining, with the electronic processor, an inconsistency between the video data and the first responder note or report by:
processing, with the electronic processor, the first responder note or report to identify a characteristic of a first person or object of interest who was present at a first time during the common incident,
analyzing, with an image analysis engine of the electronic processor, video frames within the video data that were captured at the first time during the common incident,
determining, with the electronic processor and based on analyzing the video frames, that a person or object of interest matching the characteristic of the first person or object of interest is not present in the video frames, and
in response to determining that a person or object of interest matching the characteristic of the first person or object of interest is not present in the video frames, determining, with the electronic processor, the presence of the inconsistency between the video data and the first responder note or report; and
in response to determining the presence of the inconsistency between the video data and the first responder note or report, providing, via a visual or audio output device, a visual or audio notification indicating the inconsistency between the video data and the first responder note or report;
in response to determining the presence of the inconsistency between the video data and the first responder note or report:
identifying, with the electronic processor, (i) users associated with inconsistent data and (ii) potential sources of supplemental data not yet included in an electronic incident record associated with the common incident,
transmitting, with the electronic processor, user notifications to respective user devices of the identified users,
querying, with the electronic processor, the potential sources of supplemental data,
receiving, with the electronic processor, supplemental data from a potential source of supplemental data, updated data from a user device, or both the supplemental data and the updated data,
adding, with the electronic processor, the supplemental data, the updated data, or both the supplemental data and the updated data to the electronic incident record to create a modified electronic incident record.

12. The method of claim 11, further comprising:
determining, with the electronic processor, an incident type from an incident record related to the common incident;
determining, with the electronic processor and by accessing one or both of an incident type mapping and a machine learning model using the incident type, whether a priority of the inconsistency meets an electronically stored threshold case impact level; and
in response to the priority of the inconsistency meeting the electronically stored threshold case impact level, providing a first notification via the visual or audio output device.

13. The method of claim 12, further comprising:
in response to determining that the priority of the inconsistency does not meet the electronically stored threshold case impact level, providing a second notification via the visual or audio output device, the second notification being different than the first notification.

14. The method of claim 13, wherein:
providing the first notification includes sending the first notification to a group communication including an originator of the video data and an originator of the first responder note or report, wherein the group communication is accessible via a respective user device of each of the originators; and
providing the second notification includes adding the second notification to a queue of inconsistency notifications associated with the incident record.

15. The method of claim 13, wherein:
providing the first notification includes blocking users following an originator of the video data and an originator of the first responder note or report in a chain of evidence associated with the incident record, wherein blocking users includes preventing a respective user device of each of the users from outputting the video data and the first responder note or report until the inconsistency is resolved; and providing the second notification includes sending the second notification to a group communication including the originator of the video data and the originator of the first responder note or report, wherein the group communication is accessible via a respective user device of each of the originators.

16. The method of claim 12, further comprising:

using, with the electronic processor, additional contextual information from at least one of the group consisting of (i) the video data and (ii) the first responder note or report to determine whether the priority of the inconsistency meets the electronically stored threshold case impact level;

wherein the additional contextual information includes at least one of the group consisting of an originator of the video data, an originator of the first responder note or report, a role of the originator of the video data, a role of the originator of the first responder note or report, whether the video data, the first responder note or report, or both are associated with another incident record, a point in a chain of evidence at which the inconsistency occurs, a resolution time of the inconsistency, a severity associated with the incident, and an impact of the inconsistency.

17. The method of claim 11, further comprising:

in response to determining the presence of the inconsistency between the video data and the first responder note or report, searching, with the electronic processor, at least one of the group consisting of the first data source, the second data source, and another data source for second video data of the common incident that is different from the video data already received by the electronic processor; and add the second video data to an incident record of the common incident, wherein the second video data is configured to aid a user in resolving the inconsistency.

18. The method of claim 17, wherein the second video data was captured from a different perspective than the video data already received by the electronic processor.

19. The method of claim 11, wherein processing the first responder note or report includes processing, with the electronic processor and utilizing optical character recognition, the first responder note or report to (i) identify the characteristic of the first person or object of interest and (ii) determine the first time, and further comprising:

determining, based on the first time, the video frames to analyze using the image analysis engine, wherein analyzing the video frames includes using facial recognition software, object detection software, or both facial recognition software and object detection software.

* * * * *